US009480139B2

(12) United States Patent
Zhang et al.

(10) Patent No.: US 9,480,139 B2
(45) Date of Patent: Oct. 25, 2016

(54) PLASMA ARC TORCH ELECTRODE WITH SYMMETRICAL PLASMA GAS FLOW

(71) Applicant: Hypertherm, Inc., Hanover, NH (US)

(72) Inventors: Yu Zhang, Lebanon, NH (US); Zheng Duan, Hanover, NH (US)

(73) Assignee: Hypertherm, Inc., Hanover, NH (US)

( * ) Notice: Subject to any disclaimer, the term of this patent is extended or adjusted under 35 U.S.C. 154(b) by 322 days.

(21) Appl. No.: 14/040,517

(22) Filed: Sep. 27, 2013

(65) Prior Publication Data

US 2015/0021302 A1 Jan. 22, 2015

Related U.S. Application Data

(60) Provisional application No. 61/847,844, filed on Jul. 18, 2013.

(51) Int. Cl.
| | |
|---|---|
| *B23K 9/00* | (2006.01) |
| *H05H 1/34* | (2006.01) |
| *B23K 10/00* | (2006.01) |
| *H05H 1/38* | (2006.01) |

(52) U.S. Cl.
CPC ............ *H05H 1/3405* (2013.01); *B23K 10/00* (2013.01); *H05H 1/34* (2013.01); *H05H 1/38* (2013.01); *H05H 2001/3468* (2013.01); *H05H 2001/3489* (2013.01)

(58) Field of Classification Search
CPC ..................................................... B23K 10/00
USPC .............. 219/121.5, 121.51, 121.52, 121.49
See application file for complete search history.

(56) References Cited

U.S. PATENT DOCUMENTS

| | | | |
|---|---|---|---|
| 3,207,881 A | 9/1965 | Pagan | |
| 3,210,586 A | 10/1965 | Clevett | |
| 4,791,268 A | 12/1988 | Sanders et al. | |
| 4,902,871 A | 2/1990 | Sanders et al. | |
| 5,796,067 A | 8/1998 | Enyedy et al. | |
| 5,856,647 A * | 1/1999 | Luo ........................ | B23K 10/00 219/121.48 |
| 5,897,795 A | 4/1999 | Lu et al. | |
| 5,994,663 A | 11/1999 | Lu | |
| 6,084,199 A | 7/2000 | Lindsay et al. | |
| 6,403,915 B1 | 6/2002 | Cook et al. | |
| 6,703,581 B2 | 3/2004 | Jones et al. | |
| 6,717,096 B2 | 4/2004 | Hewett et al. | |

(Continued)

FOREIGN PATENT DOCUMENTS

| | | |
|---|---|---|
| JP | 3-106572 | 5/1991 |
| WO | 2013103466 A1 | 7/2013 |

*Primary Examiner* — Dana Ross
*Assistant Examiner* — Ayub Maye
(74) *Attorney, Agent, or Firm* — Proskauer Rose LLP

(57) ABSTRACT

An electrode for a plasma arc torch includes a generally cylindrical elongated body formed of an electrically conductive material. The elongated body includes a proximal end that connects to a power supply and a distal end that receives an emissive element. The electrode can include a flange that is disposed about a surface relative to the distal end of the elongated body, extends radially from the surface of the elongated body, and is utilized to establish a uniform gas flow distribution of a plasma gas flow about the distal end of the elongated body. The electrode can include a contact element that is in electrical communication with the proximal end of the electrode. The contact element includes seating portion that has an outer width that is greater than the outermost diameter of the electrode body and is configured to position the contact element within the plasma arc torch.

18 Claims, 11 Drawing Sheets

(56) References Cited

U.S. PATENT DOCUMENTS

| | | |
|---|---|---|
| 6,903,301 B2 | 6/2005 | Jones et al. |
| 6,946,616 B2 | 9/2005 | Kinerson et al. |
| 7,202,440 B2 | 4/2007 | Hewett et al. |
| 7,435,925 B2 | 10/2008 | Griffin |
| 8,115,136 B2 * | 2/2012 | Mather ............... B23K 10/006 219/121.48 |
| 8,698,036 B1 | 4/2014 | Zhang et al. |
| 2002/0117482 A1 | 8/2002 | Hewett et al. |
| 2002/0117483 A1 | 8/2002 | Jones et al. |
| 2002/0117484 A1 | 8/2002 | Jones et al. |
| 2004/0232118 A1 | 11/2004 | Horner-Richardson et al. |
| 2005/0082263 A1 | 4/2005 | Koike et al. |
| 2007/0210034 A1 * | 9/2007 | Mather ............... B23K 10/006 219/121.5 |
| 2007/0210035 A1 | 9/2007 | Twarog et al. |
| 2008/0217305 A1 * | 9/2008 | Sanders ............... H05H 1/28 219/121.49 |
| 2012/0181257 A1 | 7/2012 | Mather et al. |
| 2013/0126487 A1 | 5/2013 | Crowe |

* cited by examiner

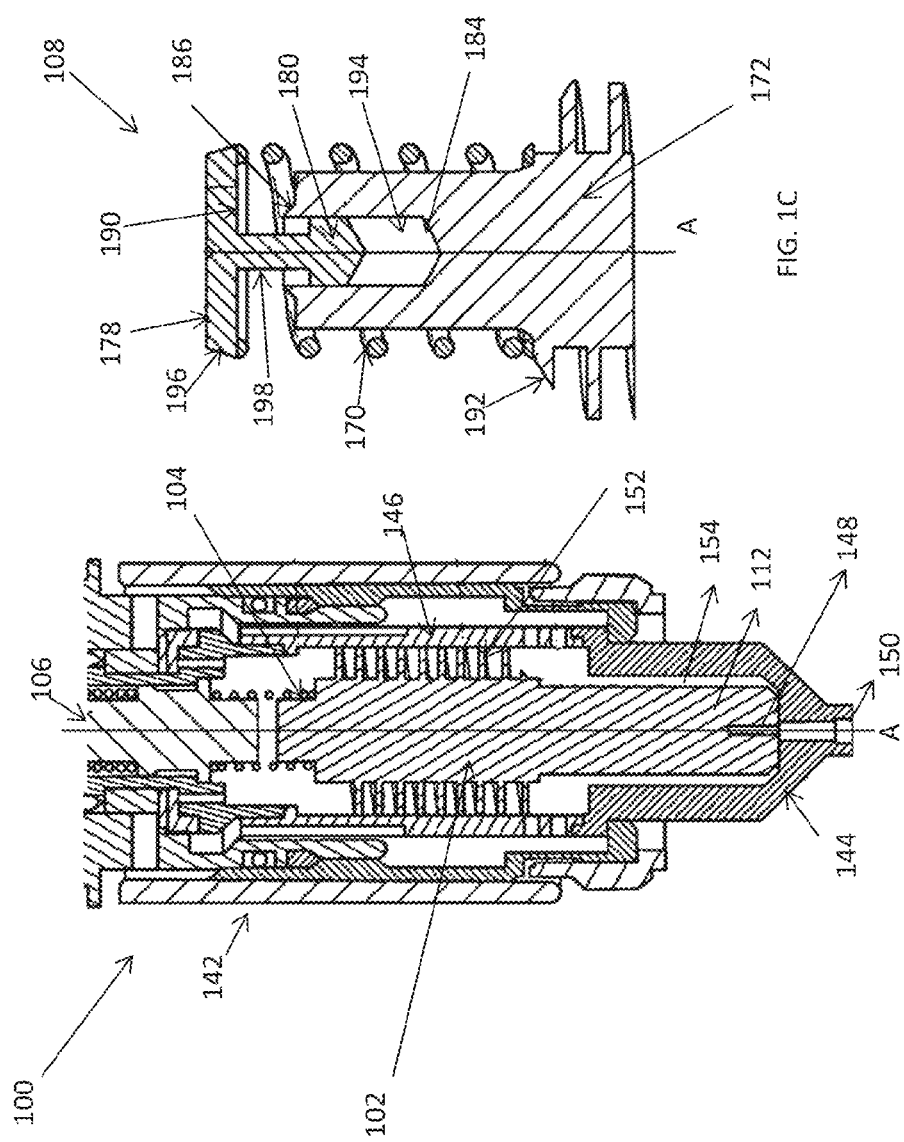

| Electrode | FIG. 2A Electrode | | FIG. 3A electrode | |
|---|---|---|---|---|
| | No. 1 | No. 2 | No. 1 | No. 2 |
| Test No. 1 | 17 | 17 | 18 | 18 |
| Test No. 2 | 17 | 17 | 19 | 19 |
| Test No. 3 | 18 | 14 | 18 | 18 |
| Average | 16.7 | | 18.3 | |
| Standard deviation | 1.4 | | 0.5 | |

FIG. 5B

| No. of test | FIG. 2A Electrode | FIG. 3A Electrode |
|---|---|---|
| 1 | 2.04 | 2.94 |
| 2 | 1.43 | 2.14 |
| 3 | 2.72 | 2.34 |
| 4 | 2.79 | 1.99 |
| 5 | 1.47 | 3.28 |
| Average life | 2.09 | 2.54 |

FIG. 5A

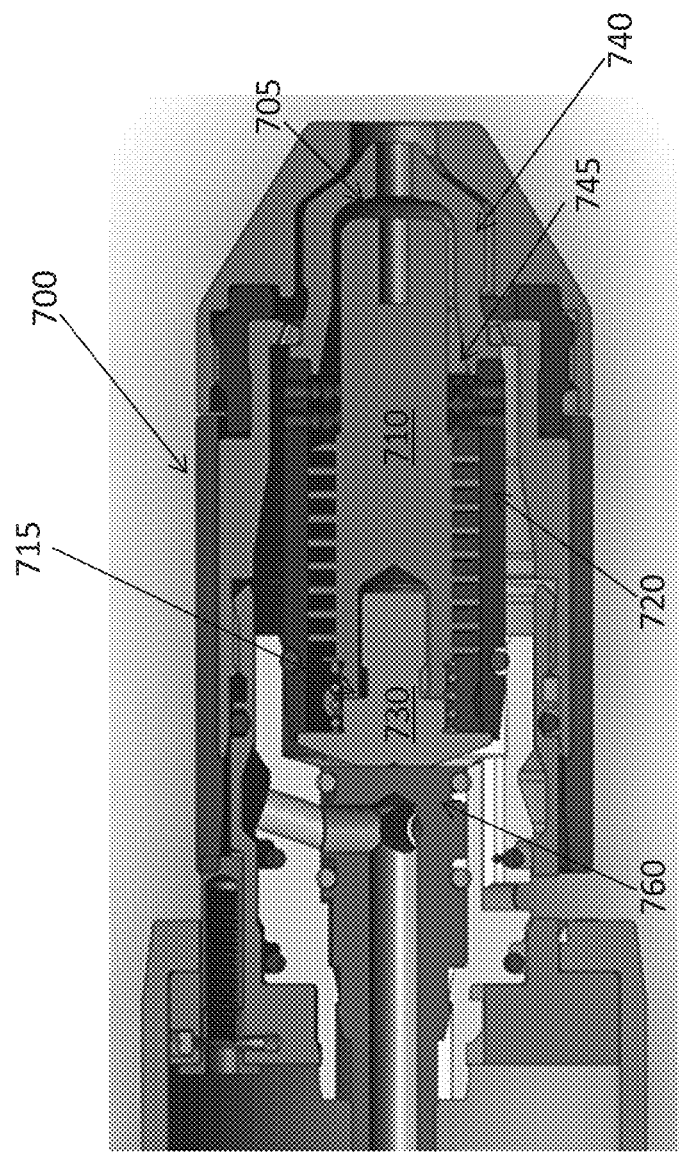

PLASMA ARC TORCH ELECTRODE WITH SYMMETRICAL PLASMA GAS FLOW

RELATED APPLICATIONS

This application claims the benefit of and priority to U.S. Provisional Application No. 61/847,844, filed on Jul. 18, 2013, the entirety of which is incorporated herein by reference.

FIELD OF THE INVENTION

The invention relates to enhanced features for plasma arc torch electrodes and methods for promoting symmetrical plasma gas flow in a plasma arc torch and aligning an electrode within a plasma arc torch.

BACKGROUND

Material processing apparatus, such as torch systems (e.g., plasma torch systems) and lasers, are widely used in the welding, cutting, and marking of materials commonly known as workpieces. A typical plasma torch system can include elements such an electrode and a nozzle having a central exit orifice mounted within a torch body, electrical connections, passages for cooling, passages for arc control fluids (e.g., plasma gas), and a power supply.

The plasma arc can be generated in various ways. For example, an arc can be generated between the electrode and the nozzle by means of any of a variety of contact starting methods. Contact start methods often involve establishing a physical contact and/or an electrical communication between the electrode and the nozzle and creating a current path between these two elements (the electrode and the nozzle).

The electrode and the nozzle are often arranged such that they create a gas chamber within the torch body. The chamber is often arranged such that it can receive a pressurized gas (plasma gas). Gas pressure in the chamber can increase until it reaches a point at which the gas pressure is sufficient to separate the contact between the electrode and the nozzle. This separation causes a plasma arc to be formed between the electrode (cathode) and the nozzle (anode) in the plasma chamber.

The plasma arc, typically, includes a constricted ionized jet of a gas with high temperature and high momentum. The arc ionizes the plasma gas to produce a plasma jet that can be transferred to the work piece for material processing.

Certain components of a material processing device (e.g., plasma arc torch) can deteriorate over time from use. These components are typically referred to as "consumables." Typical torch consumables can include the electrode, swirl ring, nozzle, and shield.

In addition, in the process of starting a plasma arc torch, the consumables can become misaligned. Such misalignments can reduce the life expectancy of torch consumables and reduce the accuracy and repeatability of plasma jet location. Although these consumable components can be easily replaceable in the field, replacing consumable components can lead to down time and reduced productivity. Therefore, proper alignment of the electrode within the plasma arc torch is essential to ensure reasonable consumable life and cut accuracy.

Further, inconsistencies in plasma gas flow patterns can adversely affect torch performance by reducing torch cutting speed and consumable life expectancy. Therefore, maintaining a symmetrical plasma pattern can be important for achieving reasonable plasma cutting performance.

SUMMARY

Some embodiments described herein relate to obtaining improved torch performance and consumable life expectancy is achieved by utilizing electrode features that promote a uniform gas flow distribution of the plasma gas.

In one aspect, an electrode for a plasma arc torch includes a generally cylindrical elongated body, a flow passage, and a flange. The electrode body is formed of an electrically conductive material and includes a proximal end and a distal end. The distal end of the electrode body can include an emissive insert. The flow passage is disposed about a first surface relative to the proximal end of the elongated body and is arranged to direct a cooling gas flow about the first surface of the elongated body. The flange is disposed between the flow passage and the distal end of the elongated body. The flange extends radially from a second surface of the elongated body and is configured to establish a substantially symmetrical gas flow distribution of a plasma gas flow about the distal end of the elongated body.

In another aspect, an electrode for a plasma arc torch can include a generally cylindrical elongated body formed of an electrically conductive material, a spiral flow passage, and a radial extension. The elongated body includes a fore end that connects to a power supply of the plasma arc torch and an aft end that receives an emissive element. The spiral flow passage is disposed about a first surface relative to the fore end of the elongated body and is configured to forward a cooling gas flow about the first surface of the elongated body. The radial extension is disposed on a second surface of the elongated body positioned between the spiral flow passage and the aft end of the elongated body and is configured to establish a substantially uniform distribution of a plasma gas flow about the aft end of the elongated body.

Yet in another aspect, an electrode for a plasma arc torch can include a generally cylindrical elongated body formed of an electrically conductive material and a flange. The elongated body can have a proximal end arranged to connect to a power supply of the plasma arc torch and a distal end arranged to receive an emissive element. The flange is disposed about a surface relative to the distal end of the elongated body. The flange can extend radially from the surface of the elongated body and can be configured to establish a uniform gas flow distribution of a plasma gas flow about the distal end of the elongated body.

In another aspect, a method for increasing a uniformity of a plasma gas flow at a distal end of an electrode for a plasma arc torch is described. A supply gas flow is introduced adjacent a radial extension disposed at a distal surface near a distal end of a body of an electrode body having an emissive element. The supply gas flow is divided into a plasma gas flow and a cooling gas flow. The cooling gas flow is directed to a flow passage that is disposed on a proximal surface of the electrode body and positioned relative to a proximal end of the electrode body. The flow passage directs the cooling gas flow about the proximal surface of the electrode to cool the proximal surface of the electrode. The plasma gas is flown over the radial extension to separate a radially symmetrical gas flow distribution of the plasma gas flow about the distal end of the electrode from the cooling gas flow.

In one aspect, an electrode for a plasma arc torch can include an electrically conductive body having a central axis disposed between a first end and a second end and a contact element in electrical communication with the first end of the conductive body. The conductive body can be moveable along the central axis within a hollow torch member and the second end of the conductive body can be configured to receive an emissive element. The contact element can include a proximal end and a distal end. The distal portion can be configured to provide the torch current to the first end of the conductive body of the electrode. The proximal end can include a head portion that receives a torch current from a torch body within the torch. The proximal end of the contact element can have a feature at an outer circumference of the head portion that secures the electrode at an end of the hollow torch member. The proximal end of the contact element and the feature can create a surface that has a diameter greater than an inner diameter of the hollow torch member.

In another aspect, an electrode for a plasma arc torch can include an electrically conductive body and a contact element. The electrically conductive body can have outermost diameter, a first end, and a second end. The second end of the conductive body can be configured to receive an emissive element. The contact element is in electrical communication with the first end of the conductive body of the electrode and includes a proximal end, a seating portion, and a distal portion. The proximal end includes a head portion that includes a torch body contact surface configured to receive a torch current from the torch. The seating portion includes an outer width that is greater than the outermost diameter of the electrode body and is configured to position the contact element within the plasma arc torch. The distal portion includes a contact surface that is configured to slideably engage with the electrode body and to provide the torch current to the first end of the conductive body.

In yet another aspect, a swirl ring for a plasma arc torch can include a hollow body having a first end and a second end. The hollow body can be dimensioned to receive an electrode for the plasma arc torch. The first end of the hollow body can be disposed proximate to a torch body contact surface and include a nesting region configured to conform with and engage a surface of a contact element of the electrode to axially align the contact element and the second end of the hollow body can have an inner surface adjacent to an outer surface of the electrode body.

In another aspect, a method for aligning an electrode within a plasma arc torch is featured. The electrode includes a contact element and an elongated body. The electrode can be inserted into a first end of a hollow body of a replaceable component such that the elongated body extends into the hollow body and the contact element engages the first end. The contact element can be secured between the hollow body and a torch structure. The torch structure can have a longitudinal axis extending therethrough. The contact element is secured such that it causes alignment of the elongated body along the longitudinal axis by enabling mated contact of a surface of the contact element with a corresponding surface of the hollow body.

In other examples, any of the aspects above, or any apparatus or method described herein, can include one or more of the following features.

The flow passage can include at least one spiral groove disposed about the first surface of the elongated body. The radial height defined by the flow passage can be larger than a radial height defined by the flange. The flow passage can include one or more fins disposed about the first surface of the elongated body. The flange can be arranged to substantially maintain a pressure of the plasma gas flow along the elongated body. For example, the flange can be arranged to ensure that the plasma gas flow experiences very low (e.g., zero or approximately zero) pressure drop across the flange.

The flange can be configured to extend circumferentially along the second surface of the elongated body. The flange can include one or more discontinuities along its surface. The flange can be arranged to substantially isolate a non-symmetrical flow pattern of the cooling gas from the substantially symmetrical plasma gas flow distribution.

The radial extension can extend circumferentially around the second surface of the elongated body. The spiral flow passage can include two or more spiral flow grooves and the flow grooves can be uniformly distributed about the first surface of the electrode body. The radial extension can be used to substantially isolate a non-symmetrical flow pattern of the cooling gas flow from the radially symmetrical plasma gas flow circulating about the distal end of the electrode.

The distal portion of the contact element can include a neck portion having a central axis that aligns with the central axis of the conductive body. The neck portion of the contact element can be configured to moveably engage the conductive body. The contact element can be secured within the electrode body.

The feature can align the contact element and the hollow torch member with the central axis of electrode body. The hollow torch member can be a swirl ring.

The outer width of the seating portion of the contact element can have an outer diameter defining a circumferential flange. The seating portion can include at least one of an alignment ridge, a step, a pattern, a key-way, or a slot. The perimeter of the outer width can be non-circular.

The electrode body can include a cooling structure and the outermost diameter of the electrode body is an outer diameter of the cooling structure. The cooling structure can include a spiral groove. The electrode can include a resilient element that is positioned to bias the contact element away from the conductive electrode body.

The nesting surface can fixedly secure the contact element of the electrode between the first end of the hollow body and the torch body contact surface. The nesting surface can include a contour, step or flange configured to radially align the contact element. The nesting surface can include a feature that is configured to promote alignment of a component of the plasma arc torch with a longitudinal axis of the hollow body. The hollow body can be a replaceable component of the plasma arc torch. The replaceable component can be a swirl ring.

The contact element can be secured by attaching a retaining cap to retain the electrode and replaceable component within the plasma arc torch. The contact element can be secured by applying a compression force along the longitudinal axis that promotes transverse alignment of the electrode. The contact element can be radially aligned within the hollow body by enabling mated contact of the surface of the contact element with the corresponding surface of the hollow body.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

FIG. 1B is an illustration of a plasma arc torch.

FIG. 1C is an illustration of a proximal end of an electrode that can be used with a contact start plasma torch.

FIG. 5A is a chart that compares the average life span of a traditional electrode (e.g., shown in FIG. 2A) to the life span of an electrode (e.g., shown in FIG. 3A) developed according to some embodiments disclosed herein.

FIG. 5B is a chart that compares the average cutting speed obtained using a torch utilizing a traditional electrode (e.g., shown in FIG. 2A) to the average cutting speed obtained using a torch utilizing an electrode (e.g., shown in FIG. 3A) developed according to some embodiments disclosed herein.

FIG. 7 is an illustrative example of a plasma arc torch having an electrode according to certain embodiments described herein.

DETAILED DESCRIPTION

Figure 1A:
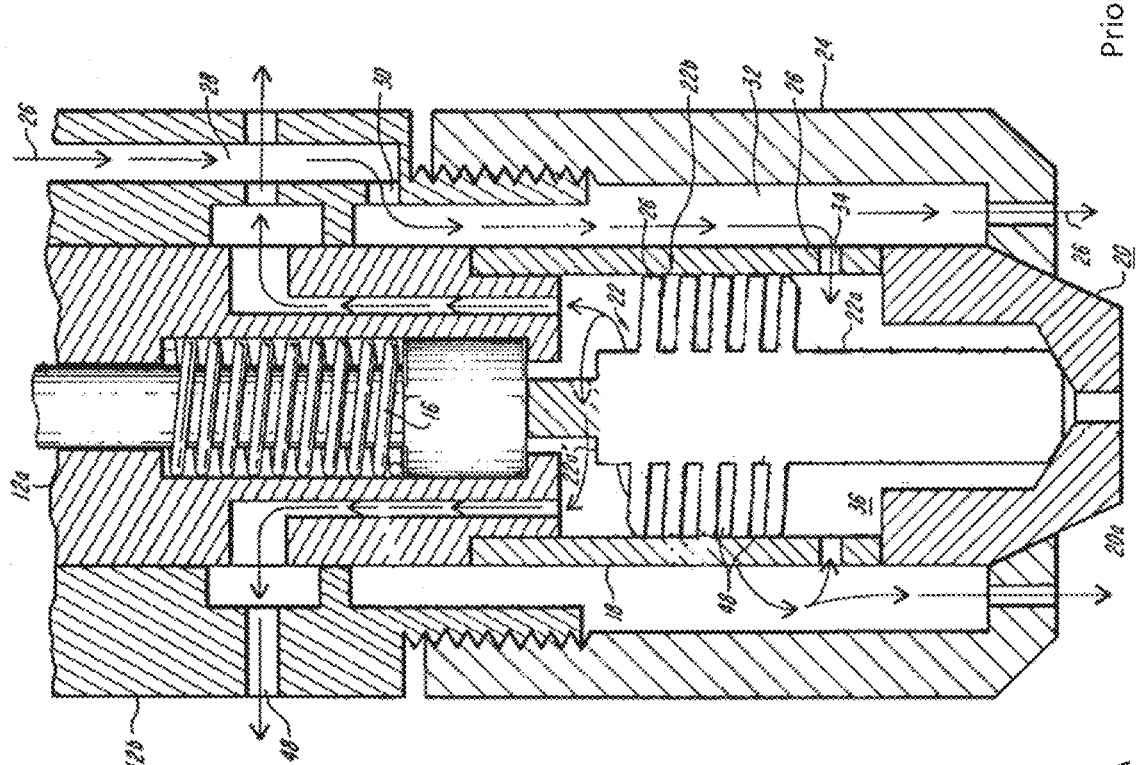
FIG. 1A is an illustration of a plasma arc torch.

FIG. 1A is an example of a plasma torch 10 that can be used with the embodiments disclosed herein. The torch 10 can include a torch body 12 and have an inner component 12a and an outer component 12b.

The consumable components of the torch 10 can include a swirl ring 18, nozzle 20, electrode 22, and shield (cap) 24. The swirl ring 18 can be secured to the lower end of the inner body component 12a. The nozzle 20 can have a central plasma arc exit orifice 20a and be arranged such that it is captured by the shield 24 and held in place. The shield 24 is often threaded onto the outer body component 12b at its lower end.

The electrode 22 is typically made of an electrically conductive material and arranged to be movable within the swirl ring 18 such that when in a starting position (e.g., shown in FIG. 1), the lower end of the electrode 22a can close off the nozzle 20 and when in a raised operating position, the exit orifice 20a is open and an upper end of the electrode 22a" either abuts or is near the lower end of the inner body component 12a. This raising movement of the electrode can be accomplished using fluid forces.

Specifically, in a typical plasma arc torch 10, a flow of pressurized plasma supply gas 26 is directed to a plasma chamber 36 located between the electrode 22 and the nozzle 20. For example, in the torch shown in FIG. 1, the pressurized plasma gas flow 26 enters the torch 10 via a passage 28, port or ports 30, an annular passage 32, passes through the canted ports 34, and enters the plasma chamber 36.

The electrode 22 is surrounded by the swirl ring 18 and includes a gas flow passage 48, positioned on an outer side surface of the electrode 22. The flow passage 48 can divert a portion of the supply gas flow 26, through the electrode, to cool the electrode. The diverted gas serves as a cooling gas for the electrode 22 and is ultimately forwarded to a region above the electrode where the gas is vented to atmosphere.

The electrode flow passage 48 (e.g., a spiral flow passage) can include a spiral groove formed on the outer side walls of the shoulder portion 22b of the electrode 22. The spiral grooves are arranged to direct the cooling gas flow through the electrode body and provide the electrode 22 with a cooling effect.

Therefore, a typical plasma arc torch 10 can include at least two types of gas flow: the pressured plasma gas 26 and the cooling gas. The pressurized plasma gas 26 is directed along the torch 10, near the lower end of the electrode 22a, to the plasma chamber 36 and the nozzle 20. The cooling gas 26 is directed along the torch 10, through the electrode 22, and towards the upper end of the electrode 22a".

FIG. 1B is an example of a contact start plasma arc torch 100 prior to pilot arc operation. A similar contact start plasma torch is described in U.S. Pat. No. 8,115,136, assigned to Hypertherm, Inc., of Hanover, N.H., the entirety of which is incorporated herein by reference. The torch 100 includes an electrode body 102, a resilient conductive element 104, and a power contact 106 mounted within the torch body 100. A nozzle 144 and a swirl ring 146 are also mounted to the torch body 100. The power contact 106 is positioned, relatively stationary with respect to the moveable electrode body 102, opposite from the distal end 112 of the electrode body 102 (e.g., at the back end of the torch 100).

The distal end 112 of the electrode body 102 includes an emissive element 148 substantially aligned with respect to an exit orifice 150 of the nozzle 144. The emissive element 148 and the exit orifice 150 can be substantially centered about the longitudinal axis A. The swirl ring 146 is arranged such that it can restrain radial motion of the electrode body 102 within the torch body 100. For example, the swirl ring 146 can be manufactured to permit a relatively small gap between the swirl ring 146 and one or more radial fins 152 of the electrode body 102.

The resilient conductive element 104 reacts against the reaction surface of the electrode body 102 and against the surface 114 of the power contact 106 to urge the electrode body 102 into abutting relation with the nozzle 144. Gas can flow into a plasma chamber 154 formed between the electrode body 102 and the nozzle 144, and a pilot current is passed from the power supply (not shown) to the power contact 106.

Gas pressure can build within the plasma chamber 154 until the pressure is sufficient to overcome the force provided by the resilient conductive element 104. The gas pressure moves the electrode body 102 away from the nozzle 144 and into an abutting relationship with the power contact 106. The electrode body 102 moves substantially along the longitudinal axis A. As the electrode body 102 is moved away from the nozzle 144 by gas pressure, an arc is generated or initiated in the plasma chamber 154. The arc ionizes the gas within the plasma chamber 154 to form a plasma arc or jet that exits the orifice 150 of the nozzle 244 and is transferred to the workpiece (not shown).

The resilient conductive element 104 can be configured to pass substantially all of the pilot current between the power contact 106 and the electrode body 102. The resilient conductive element 104 can be formed from a material that facilitates both carrying the electrical current or load associated with initiating a pilot arc and dissipating thermal heat associated with the current to prevent the resilient conductive element from melting during pilot arc operation. The material of the resilient conductive element 104 can be selected, for example, based on the current rating of the material. The resilient conductive element 104 can serve as the path of least resistance and/or highest conductance between the power contact 106 and the electrode body 102. Additionally, the mechanical properties of the resilient conductive element 104 facilitate movement of the electrode body for contact starting the plasma arc torch. The resilient element can further aid in aligning the electrode body relative to the torch.

FIG. 1C is an illustration of a proximal end 108 of an electrode that can be used with a contact start plasma torch such as that shown in FIG. 1B. In the illustrated embodiment, the electrode body 172, resilient conductive element 170, and the contact element 196 do not form an integral assembly. More particularly, the contact element 196 can be freely disengaged from the resilient conductive element 170 and the electrode body 172 (e.g., the receptacle 194).

The proximal end 108 of the electrode body 172 can define a lip 186 adjacent the receptacle 194 that extends axially along the longitudinal axis A. The lip 186 can be formed from the same piece of material as the electrode body 172. The contact element 196 can be retained with respect to the electrode body 172 (e.g., a portion of the electrode body 172 hinders disengagement of the contact element 196 from the electrode body 172). For example, the connective member 198 and the aligning portion 180 can be positioned within the receptacle 194. The contact element 196 is pressed against the electrode body 172 such that the second surface 190 of the contact element 196 engages the lip 186 as the second surface 190 advances into physical contact with the contact surface 182 of the electrode body 172. The engagement between the second surface 190 and the lip 186 deforms the lip 186 into the adjacent receptacle 194 to enable facing physical contact between the second surface 190 of the contact element 178 and the contact surface 182 of the electrode body 172.

The resilient conductive element 170 can be disposed between the electrode body 172 (e.g., in physical contact with the flange 192) and the contact element 196 (e.g., in physical contact with the second surface 190) prior to deforming the lip 186. The resilient conductive element 170 can be captured between the contact element 196 and the electrode body 172. The contact surface 182 can hinder disengagement of the slideably mounted contact element 196 from the electrode body 172. The power contact 106 can be electrically connected with the electrode body 172 via a top surface of contact element 178 and possible separations between the top surface and the power contact 106 can cause arcing.

Figure 2B:
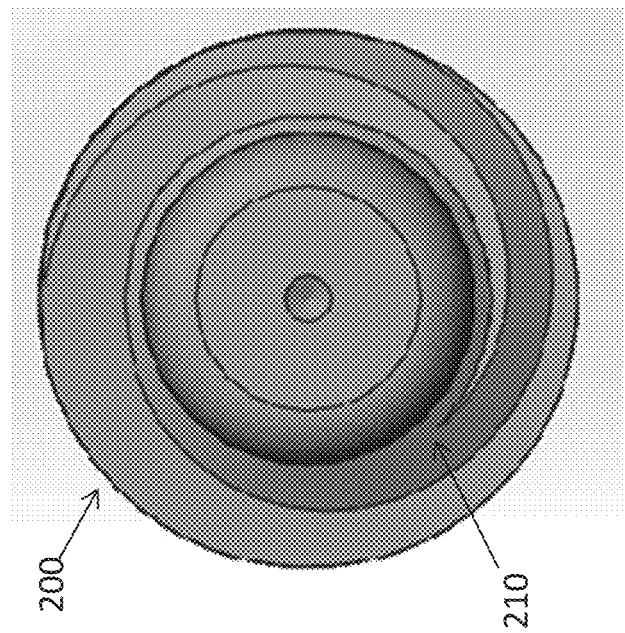
FIG. 2B illustrates a bottom view of the spiral electrode shown in FIG. 2A.
Figure 2A:
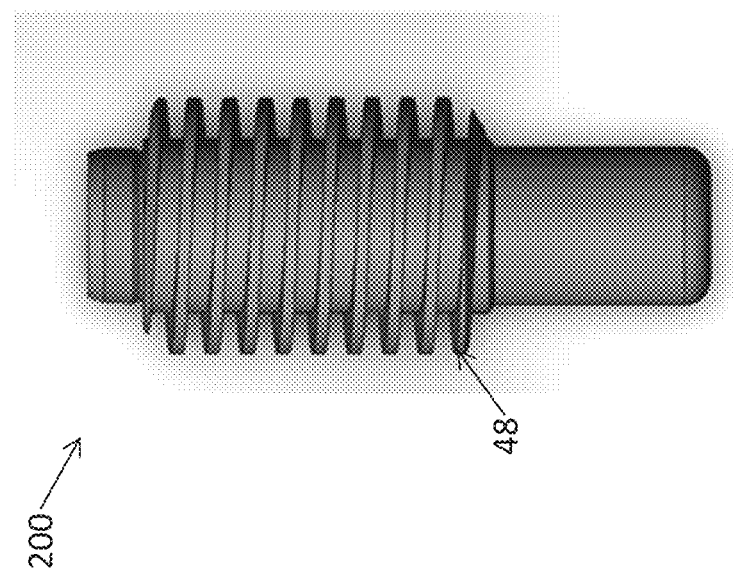
FIG. 2A illustrates an example of an electrode having a spiral flow passage.

FIG. 2A illustrates an example of a side view of an electrode 200 having a spiral flow passage 48. FIG. 2B illustrates a bottom view 200 of the spiral electrode shown in FIG. 2A. As shown in FIG. 2A, in a typical spiral electrode, cooling gas flow enters the electrode 22 from a starting/entry point 210 located on one side of the electrode 22. This can result in possible inconsistencies and non-uniformities in the flow pattern of the cooling gas being directed through the electrode 22 flow passage 48. The non-uniform flow pattern of the cooling gas can, in turn, influence the plasma gas flow 26 being directed through the swirl ring 18 to the plasma chamber 36 and result in inconsistencies and asymmetries in the flow pattern of the plasma gas 26 in the plasma arc torch. Such inconsistencies and/or asymmetries in the flow pattern of the plasma gas 26 can in turn reduce the cutting performance of the plasma arc torch, its cutting speed, and the life expectancies of its consumable components.

Figure 3A:
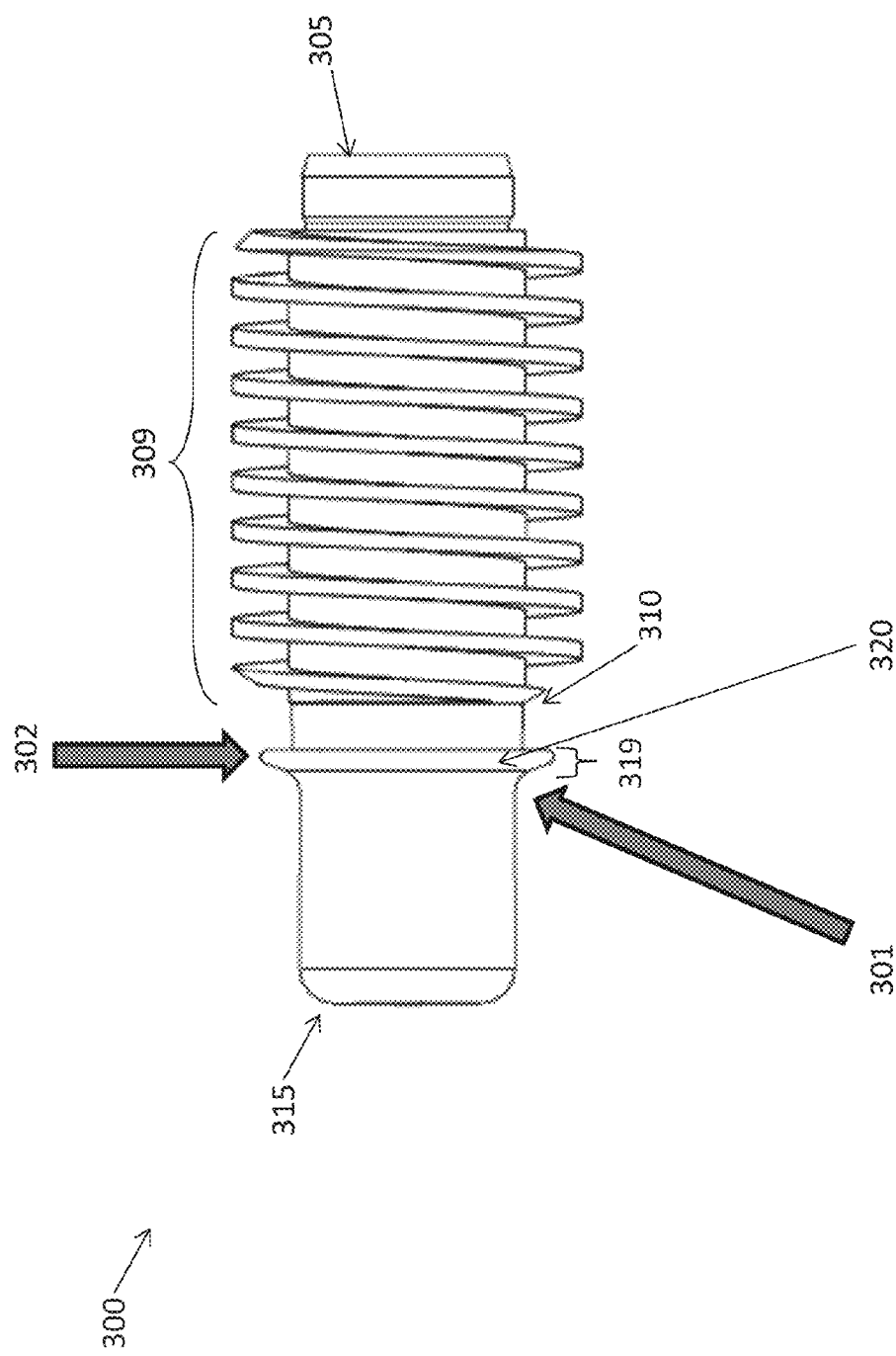
FIG. 3A is an illustrative example of a side view of an electrode according to some embodiments disclosed herein.
Figure 3B:
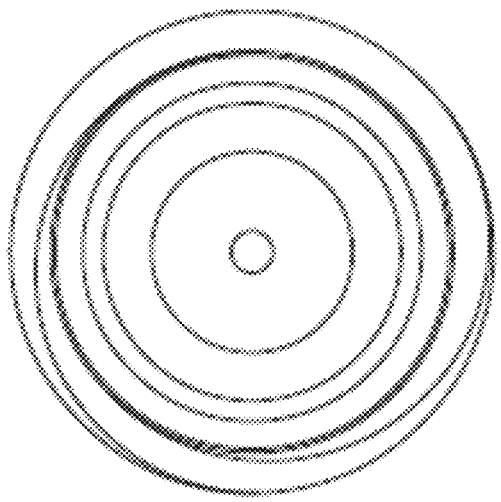
FIG. 3B illustrates a bottom view of the electrode shown in FIG. 3A.

FIG. 3A is an illustrative example of a side view of an electrode 300 according to some embodiments disclosed herein. FIG. 3B illustrates a bottom view of the example electrode 300 shown in FIG. 3A. As shown in FIG. 3A, the electrode 300 includes a flow passage 310 and a flange 320. The flow passage is positioned on the surface 309 of the electrode body in an area adjacent to the distal end 305 of the electrode body. The flow passage 310 can include one or more fins disposed about the surface 309 of the electrode body. The fins can have an initial size and ramp up (increase) in size as they transition away from the flange 319 to the proximal end 305 of the electrode. The flow passage can be a spiral flow passage.

The flange 320 is positioned on the surface 319 of the electrode body, in an area between the flow passage 310 and the proximal end 315 of the electrode body. The flange 320 can be an external flange that extends out of the surface 319 of the electrode body. The flange can be arranged such that it extends radially and/or circumferentially relative to the surface of the electrode body. The flange can include one or more irregularities about its perimeter. The flange can be non-contiguous or continuous.

A supply flow of gas can be introduced from various points to the plasma arc torch. For example, the supply flow can be introduced to the plasma torch near an edge of the flange 320 (the direction generally shown by arrow 302) resulting a portion of the supply flow to be forwarded towards the proximal end 315 of the electrode to serve as the plasma gas 26. Another portion of the supply flow can be forwarded towards the distal end 305 of the electrode to enter the flow passage 310 and serve as a cooling gas. Alternatively/additionally, the supply gas flow can be introduced at a point between the proximal end 315 of the electrode 300 and the flange 320. When applied under such conditions, the supply flow is separated by the flange 320 such that a portion of it is forwarded to the flow passage 310 to serve as cooling gas and another portion is forwarded towards the proximal end 315 of the electrode 300 to serve as plasma gas 26.

The flange 320 can improve the symmetry and uniformity of the plasma gas flow 26 in a number of ways. For example, the flange can serve as a medium for separating the plasma gas flow 26 from the cooling gas flow. Since the cooling gas flow can form a large portion of the overall gas flowing in the plasma arc torch, and given that the cooling gas flowing in the flow passage 310 can have an asymmetrical pattern, by separating the plasma gas flow 26 from the cooling gas flow, the flange 320 isolates the plasma gas flow 26 from asymmetrical influence of the cooling gas, thereby promoting a uniform and symmetrical flow pattern in the plasma gas 26.

The presence of the flange 320 can also influence the flow pattern of the gases circulating in the plasma arc torch 10. Specifically, the flange is positioned such that it can create a certain amount of turbulence in the flow of the plasma gas 26 that promotes uniformity and symmetry in the flow pattern of the plasma gas 26. For example, a supply gas introduced to the electrode body in the volume between the flange and the cooling channel has an increased turbulence and mixing in this volume due to the presence of the flange. The increased turbulence and the pressure drop of the gas as it flows across the flange toward the distal end of the electrode promotes an increased uniformity of gas flow and velocity about the perimeter of the electrode body as the gas flows toward the distal end, and the increased uniformity of this plasma gas flow results in improved electrode life and performance.

Although, the flow passage 310 and the flange 320 are shown in FIG. 3A as two distinct components of the electrode 300, the flange 320 and the flow passage 310 can be portions of the same component. For example, the flange 320 can be included in, be a portion of, and/or be an extension of the flow passage 310. Further, the flange 320 and the flow passage 310 can have various radial heights and/or be positioned at various distances relative to each other on the surface of the electrode body. For example, the flow passage 310 can have a radial height that is greater than the radial height of the flow flange 320. Further, the ratio of the electrode surface 319 covered by the flange 320 to the electrode surface 309 covered by the flow passage 310 can vary.

Figure 4B:
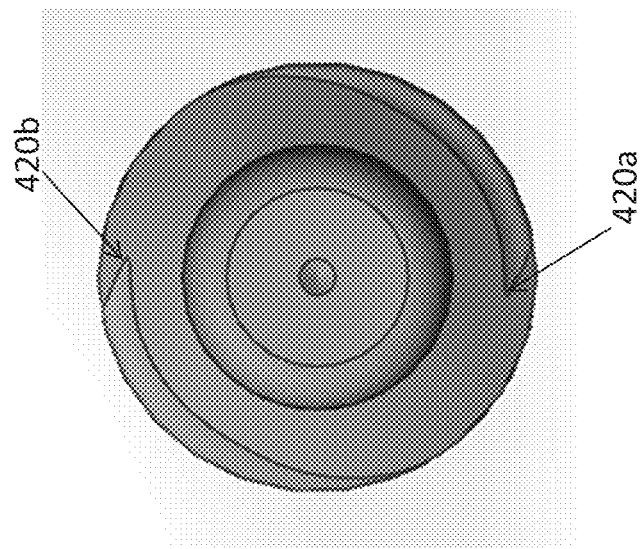
FIG. 4B illustrates a bottom view of the example electrode shown in FIG. 4A.
Figure 4A:
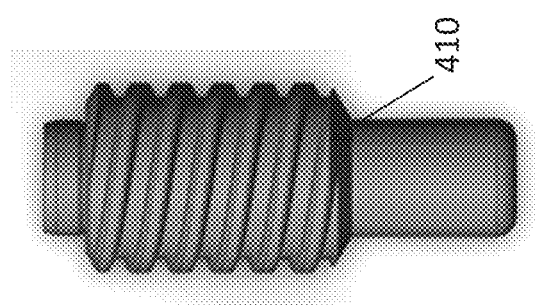
FIG. 4A is an illustrative example of a side view of an electrode for promoting cooling gas symmetry according to some embodiments disclosed herein.

Plasma gas symmetry and uniformity in the torch 10 can further be promoted by improving symmetry and uniformity of the cooling gas flow and thereby preventing possible adverse influence on the plasma gas flow. FIG. 4A is an illustrative example of a side view of an electrode 400 for promoting cooling gas symmetry according to some embodiments disclosed herein. FIG. 4B illustrates a bottom view of the example electrode 400 shown in FIG. 4A.

The flow passage 410 can be a spiral flow passage having two or more uniformly distributed spiral grooves. The uniformly distributed spiral grooves allow for the cooling flow to enter the flow passage 410 via uniformly distributed starting points 420a, 420b, thereby promoting a more uniform flow of cooling gas in the flow passage 410.

FIG. 5A is a chart that compares the average life span of a traditional electrode (e.g., shown in FIG. 2A) to the life span of an electrode (e.g., shown in FIG. 3A) developed according to some embodiments disclosed herein. As shown in FIG. 5A, a traditional electrode can have an average life span of about 2.09 hours. However, a torch electrode having a flange, similar to one described in FIG. 3A, can have an average life expectancy of about 2.54 hours. This corresponds to approximately 24 percent increase in the cutting life expectancy of the electrode, a substantial improvement.

FIG. 5B is a chart that compares the average cutting speed obtained using a torch utilizing a traditional electrode (e.g., shown in FIG. 2A) to the average cutting speed obtained using a torch utilizing an electrode (e.g., shown in FIG. 3A) developed according to some embodiments disclosed herein. In this experimental analysis, two sets of each of the consumables (two sets of each of the electrodes) are utilized in cutting a 1½" thick mild steel workpieces and the experiment with each electrode was repeated three times. When using a traditional electrode (e.g., shown in FIG. 2A), the first electrode (No. 1) reaches a speed of 17 inches/minute in the first experiment, 17 inches/minute in the second experiment, and 18 inches/minute in the third experiment. The second electrode (No. 2) reaches a speed of 17 inches/minute in the first experiment, 17 inches/minute in the second experiment, and 14 inches/minute in the third experiment. The average speed reached using the first electrode is about 16.7 inches/minute and the standard deviation of the speed reached is about 1.4.

However, when using a traditional electrode (e.g., shown in FIG. 2A), the first electrode (No. 2) reaches a speed of 18 inches/minute in the first experiment, 19 inches/minute in the second experiment, and 18 inches/minute in the third experiment. The second electrode (No. 2) reaches a speed of 18 inches/minute in the first experiment, 19 inches/minute in the second experiment, and 18 inches/minute in the third experiment. The average speed reached using the first electrode is about 18.3 inches/minute and the standard deviation of the speed reached is about 0.5.

Therefore, experimental analysis can be used to demonstrate that an electrode developed according to some embodiments disclosed herein, such as that shown in FIG. 3A, can achieve higher and more consistent cutting speeds.

Figure 6B:
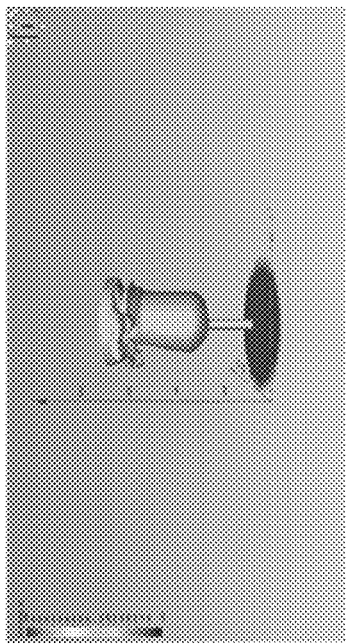
FIG. 6B illustrates a plasma flow pattern that can be obtained using a traditional electrode under similar conditions as those utilized in obtaining the pattern shown in FIG. 6A.
Figure 6D:
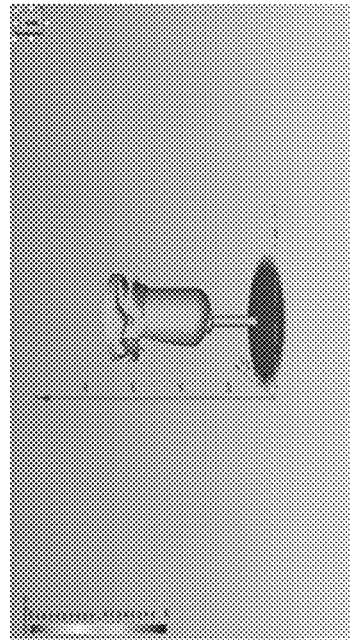
FIG. 6D illustrates a plasma flow pattern that can be obtained using a traditional electrode under similar conditions as those utilized in obtaining the pattern shown in FIG. 6C.
Figure 6F:
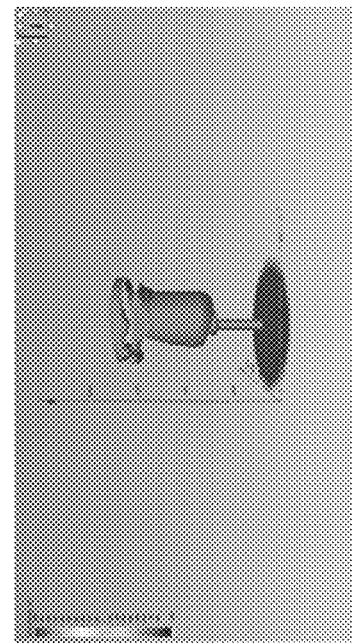
FIG. 6F illustrates a plasma flow pattern that can be obtained using a traditional electrode under similar conditions as those utilized in obtaining the pattern shown in FIG. 6E.
Figure 6A:
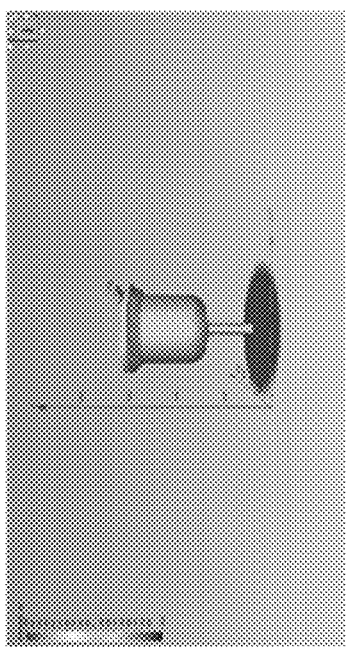
FIG. 6A illustrates a plasma flow pattern that can be obtained using an electrode having similar features to the electrode described in FIG. 3A.
Figure 6C:
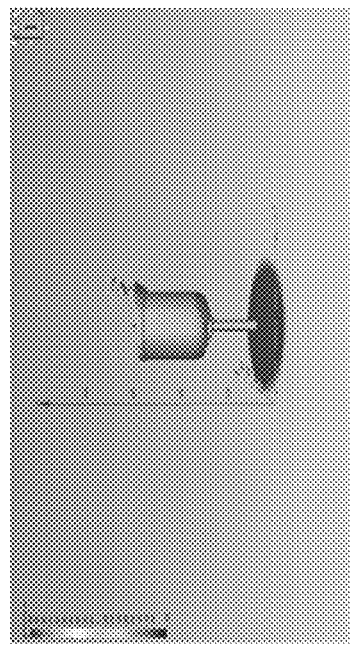
FIG. 6C illustrates a plasma flow pattern that can be obtained using an electrode having similar features to the electrode described in FIG. 3A.
Figure 6E:
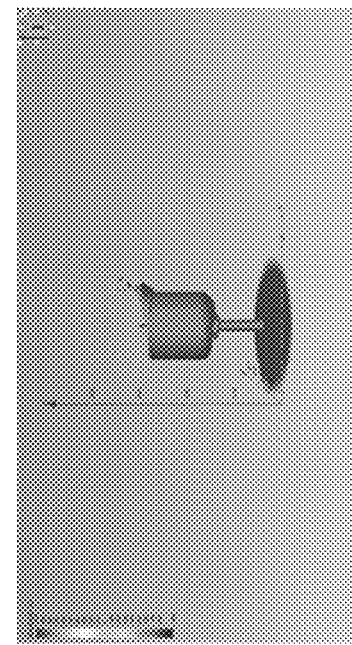
FIG. 6E illustrates a plasma flow pattern that can be obtained using an electrode having similar features to the electrode described in FIG. 3A.

FIG. 6A-FIG. 6F illustrate a plasma flow pattern that can be obtained using an electrode having similar features (e.g., flange) to the electrode described in FIG. 3A. The plasma flow pattern is mapped around the tip of the nozzle, adjacent to the distal end of the electrode, of the plasma torch utilizing the electrode. FIG. 6A illustrates an example of flow pattern for a plasma arc torch. The plot shown in FIG. 6A is an iso-surface plot in which surface velocity is approximately −200 inch per second. FIG. 6B illustrates a plasma flow pattern obtained using a traditional electrode, such as the electrode shown in FIG. 2A. The flow pattern shown in FIG. 6B is obtained using similar velocity conditions as those used for obtaining the flow pattern shown in FIG. 6A. As shown, the plasma gas flow of FIG. 6A appears to be more uniformly and symmetrically distributed than the flow shown in FIG. 6B. Similar experiments can repeated under various surface velocity levels. For example, the plasma patterns shown in FIG. 6C and FIG. 6D were obtained while operating under surface velocity of approximately −400 inches per second using an electrode having a flange (plasma pattern shown in FIG. 6C) and an electrode without a flange (plasma pattern shown in FIG. 6D). Similarly, the plasma patterns shown in FIG. 6E and FIG. 6F were obtained while operating the torch under surface velocity of approximately −600 inch per second using an electrode having a flange (plasma pattern shown in FIG. 6E) and an electrode without a flange (plasma pattern shown in FIG. 6F). As shown, the differences in the flow characteristics become more apparent as the surface velocity is increased. Further, the electrode having a flange (e.g., electrode shown in FIG. 3A) provides a more uniform flow around the distal end of the electrode (as shown in FIGS. 6C and 6E) than a traditional electrode.

In a traditional spring electrode the inner diameter of the swirl ring is larger than the diameter of the electrode plunger (also known as contact element). Under such setup, while the plasma torch is being operated, the pressure force exerted by the pressured plasma gas in the plasma chamber maintains the electrode in place such that the electrode is in full contact with the contact element and the electrical current driving the electrode can pass through the contact area established between the electrode body and the contact element. Accordingly, very little current is passed through the spring that drives the contact element. However, in low pressure conditions, when the pressure of the gas flow in the plasma chamber falls below a certain threshold (e.g., 20 psi), the pressure force exerted by the plasma gas can no longer hold the electrode in place. This can lead to the separation of the contact element from the electrode body. For example, the electrode body and the contact element can separate at one of their contact surfaces. Once the contact element and the electrode body are separated, the electrical current driving the electrode can pass directly through the spring, generating a large amount of heat in the spring, and possibly causing the spring to be melted by the heat.

Once the spring is melted, the contact element (e.g., contact element 196 of FIG. 1C) can separate from the torch (e.g., power contact 106), removing the contact point previously established between the torch and the electrode. Given that a large amount of electrical current can be passing between the contact element 196 and power contact 106, an arc can be generated as the electrode and the torch begin to separate. The arc can, in turn, generate a large amount of heat, causing the electrode and other torch portions (e.g., power contact 106, often called a cathode) to melt, and possibly result in welding the two pieces together.

Some embodiments of the present invention relate to increasing cut accuracy of a plasma torch and increasing life expectancy of its consumable components by improving alignment of an electrode within the plasma arc torch.

FIG. 7 is an illustrative example of a plasma arc torch 700 having an electrode 710 according to certain embodiments described herein. The torch 700 includes a swirl ring 720 that insulates the electrode 710 from the nozzle 740 and can also be utilized to restrain radial movements of the electrode 710 within the torch 700. The electrode 710, swirl ring 720, and nozzle 740 define a plasma gas chamber 745 that contains a pressurized plasma gas flow. The plasma gas can be directed to the plasma gas chamber 745 through the swirl ring. In some implementations, the swirl ring can have a number of distribution holes, referred to as swirl holes, which are responsible for forwarding the plasma gas.

The first end 715 of the electrode can be coupled with a contact element 730. The contact element 730 can be a conductive medium that conducts an electrical current between a power supply (not shown) and the electrode 710.

Figure 8:
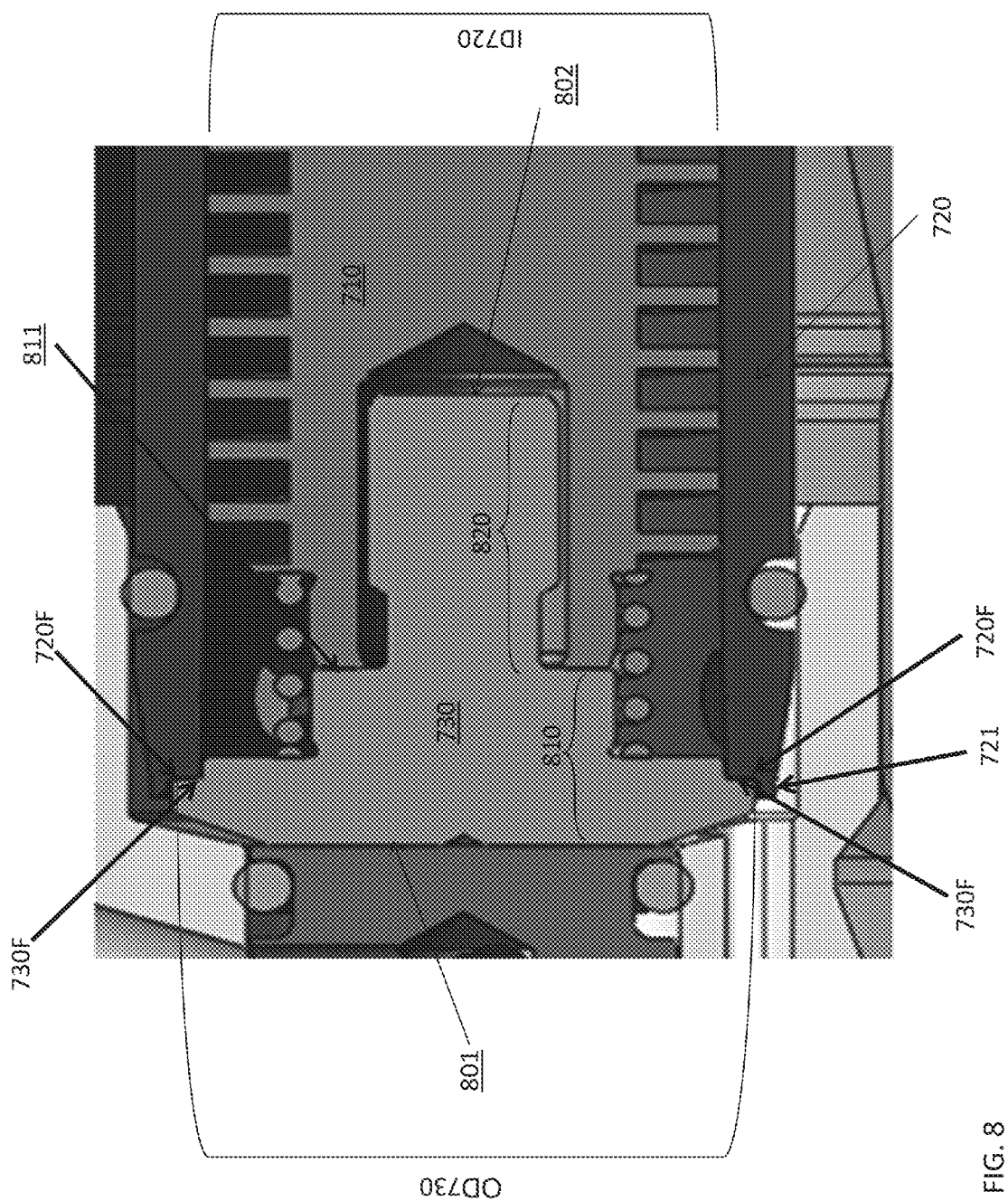
FIG. 8 includes a detailed illustration of an example of a relationship that can be established between an electrode and a swirl ring according to some embodiments described herein.

FIG. 8 includes a detailed illustration of an example of a relationship that can be established between an electrode and a swirl ring according to some embodiments described herein. The contact element 730 can include a proximal end 801 and a distal end 802. The contact element can also include a head portion 810 and a neck portion 820. The contact element 730 receives the electrical torch current for driving the torch at its proximal end 801, and directs the electrical current through a contact surface 811 located between the head portion 810 and the neck portion of the contact element 730 to the electrode body 710. The neck portion 820 can include an elongated body having a central axis that aligns with the central axis of the electrode body and is arranged such that it engages the electrode body 710 to secure the contact element 730 to the electrode body 710.

The contact element 730 can secure the electrode 710 within the torch 700 in a number of ways. For example, the contact element 730 can have an outer diameter OD730 that is larger than the inner diameter ID720 of the swirl ring 720. The larger diameter contact element 730 can exert a mechanical force that prevents the contact element 730 from separating from the torch 700. Accordingly, under such settings, the electrical connection between the electrode 710 and the torch 700 is independent of the pressure in the plasma gas chamber 745 and continues to be maintained by the mechanical force exerted by the contact element 730. Therefore, in low pressure situations, when the pressure in the plasma gas chamber 745 is below a certain threshold, the larger diameter contact element 730 can inhibit arc generation and/or melting or welding of torch components by maintaining the electrical contact between the electrode 710 and the cathodic torch power block 760.

Further, the head portion 810 can include one or more features 730F for use in securing the electrode 710. For example, as shown in FIG. 8, the head portion 810 of the contact element 730 can include one or more features 730F that mate with complementary features 720F in the swirl ring 720 to secure the contact element 730 within the torch body 700. The contact element features 730F can include a step formed in the outer circumference of the head portion 810 of the contact element. The swirl ring 720 can include a complementary feature 720F, such as a corresponding step, for mating with the feature 730F included in the contact element 730. The contact element features 730F can include various shapes and forms. For example, features such as steps, keys, patterns, key-ways, non-coplanar, slots, tapers, and etc. can be used. In some embodiments, the contact element features 730F can include a tapering included in the electrode body 710.

The contact element 730 can include other features and/or extensions for assisting in securing and/or aligning the electrode 710. For example, the head portion 810 of the contact element 730 can include one or more flanges (not shown) on its outer circumference for securing the electrode. These flanges can be of external flanges of any shape, type, and/or size (e.g., circumferential or radial flanges can be used) and positioned in various locations along the outer circumference of the contact element 730 (e.g., if more than one flange is used, they can be positioned in an angular spacing with respect to one another). The addition of a flange to the outer circumference of the head portion 810 of the contact element increases the outer radius of the head portion 730 and aids in securing the electrode 710 within the torch 700.

As noted above, in the process of starting a plasma arc torch, the consumables can become misaligned and such misalignments can reduce the life expectancy of torch consumables and reduce the accuracy and repeatability of plasma jet location. Therefore, maintaining the alignment between the nozzle and electrode can also be critical to the cutting performance. This alignment can be maintained in a number of ways. For example, the alignment between the center of the nozzle and center of the electrode can be controlled by ensuring that the swirl ring and the contact element 730 are coaxially arranged and/or the electrode face and the swirl ring axis are perpendicularly arranged.

Although possible misalignments in the position of the electrode body can be controlled by restraining the electrode in the swirl ring, such arrangement can cause possible misalignments in the position of the contact element 730. Misalignments in the position of the contact element 730 can, in turn, cause difficulties in starting the torch and reduce the reliability of the torch. For example, the electrode plunger can be misaligned relative to the electrode body during assembly (e.g., while tightening the thread of the torch retaining cap) and/or the bottom portion of the electrode plunger can jam inside the electrode body, preventing free movement between the electrode body and contact element 730. This can cause unreliability in starting of the torch since the free movement between the electrode body and contact element 730 is necessary for the starting of the torch.

The swirl ring 720 and contact element 730 of the torch shown in FIG. 7 and FIG. 8 can further assist in promoting alignment of the electrode 710 within the torch. Specifically, as noted previously, the first end 721 of the swirl ring 720 includes a mating surface 720F that is configured to conform with and engage the contact element 730. The mating surface 720F secures the contact element 730 between the first end 721 of the swirl ring 720, thereby securing the electrode 710 within the torch body 700. The mating surface 720F of the swirl ring 720 can include features such as a contour, step or flange that facilitate mating of swirl ring 720 and the contact element 730. These features of the mating surface can further serve to promote alignment of the longitudinal axis of the electrode 710 with the longitudinal axis of the swirl ring 720.

Experimental analysis can be used to compare the cut consistency and performance of a traditional electrode with similar performance factors obtained from an electrode according to some embodiments disclosed herein (e.g., electrode shown in FIG. 7 and FIG. 8).

Figure 9A:
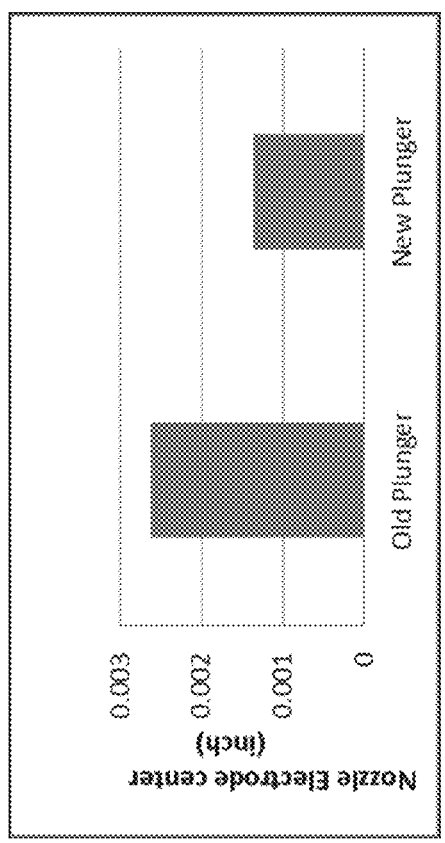
FIG. 9A is a comparison chart that compares electrode misalignments observed when using a traditional electrode with misalignments observed when using an electrode configured according to certain embodiments disclosed herein.

FIG. 9A compares the amounts of misalignment observed in the position of the electrode within the nozzle when using a traditional electrode configuration (labeled as "old plunger") to the misalignments observed in the position of the electrode within the nozzle when using a configuration similar to the configuration illustrated in FIG. 7 and FIG. 8 (labeled as "new plunger"). The measurements used to provide the chart shown in FIG. 9A were obtained through nine repeated cut tests of the similarly configured workpieces. As shown, the electrode configuration described herein (e.g., electrode shown in FIG. 7 and FIG. 8) suffers a smaller amount of misalignments.

Figure 9B:
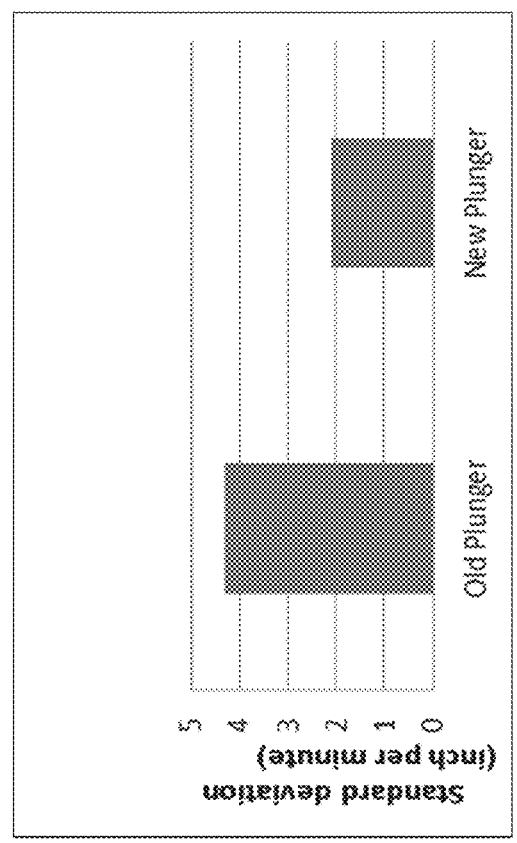
FIG. 9B is a comparison chart that compares the standard deviation of the plasma torch cutting speed when using a traditional electrode with standard deviation of the plasma torch cutting speed observed when using an electrode configured according to certain embodiments disclosed herein.

FIG. 9B is a comparison chart that compares the standard deviation of the plasma torch cutting speed (measured in inches per minute) when using a traditional electrode (labeled as "old plunger") with standard deviation of the plasma torch cutting speed observed when using an electrode configured according to certain embodiments disclosed herein, for example when using a configuration similar to the configuration illustrated in FIG. 7 and FIG. 8 (labeled as "new plunger"). The measurements used to provide the chart shown in FIG. 9B were obtained through nine repeated cut tests of the similarly configured workpieces. As shown, the speed consistency of an electrode having similar arrangements as described herein can be as much as twice more than a traditional electrode. Therefore, an electrode configured as disclosed herein can eliminate possible torch starting issues and produce a more consistent cut performance by achieving better alignment between the electrode and the nozzle.

While the invention has been particularly shown and described with reference to specific illustrative embodiments, it should be understood that various changes in form and detail may be made without departing from the spirit and scope of the invention.

What is claimed is:

1. An electrode for a plasma arc torch comprising:
   a generally cylindrical elongated body formed of an electrically conductive material having a proximal end and a distal end;
   an emissive insert disposed at the distal end of the electrode body;
   a spiral flow passage disposed about a first surface relative to the proximal end of the elongated body, the spiral flow passage configured to direct a cooling gas flow about the first surface of the elongated body, the cooling gas flow separated from a plasma gas flow, the cooling gas flow and the plasma gas flow from a supply gas flow; and
   a flange disposed between the spiral flow passage and the distal end of the elongated body, the flange extending radially from a second surface of the elongated body, the flange and the spiral flow passage defining a volume therebetween and configured to increase turbulence and mixing of the supply gas flow within the volume, thereby establishing a substantially symmetrical gas flow distribution of the plasma gas flow about the distal end of the elongated body.

2. The electrode of claim 1 wherein the spiral flow passage includes at least one spiral groove disposed about the first surface of the elongated body.

3. The electrode of claim 1 wherein the flange is configured to extend circumferentially along the second surface of the elongated body.

4. The electrode of claim 1 wherein a radial height defined by the flow passage is larger than a radial height defined by the flange.

5. The electrode of claim 1 wherein the flange is arranged to substantially isolate a non-symmetrical flow pattern of the cooling gas from the substantially symmetrical plasma gas flow distribution.

6. The electrode of claim 1 wherein the flow passage includes one or more fins disposed about the first surface of the elongated body.

7. The electrode of claim 1 wherein the flange is arranged to substantially maintain a pressure of the plasma gas flow along the elongated body.

8. The electrode of claim 3 wherein the flange includes one or more discontinuities along its surface.

9. An electrode for a plasma arc torch comprising:
   a generally cylindrical elongated body composed of an electrically conductive material, the elongated body having a fore end arranged to connect to a power supply of the plasma arc torch and an aft end arranged to receive an emissive element;
   a spiral flow passage disposed about a first surface relative to the fore end of the elongated body, the spiral flow passage configured to forward a cooling gas flow about the first surface of the elongated body, the cooling gas flow separated from a plasma gas flow, the cooling gas flow and the plasma gas flow from a supply gas flow; and
   a radial extension disposed on a second surface of the elongated body positioned between the spiral flow passage and the aft end of the elongated body, the radial extension and the spiral flow passage defining a volume therebetween and configured to increase turbulence and mixing of the supply gas flow within the volume, thereby establishing a substantially symmetrical gas flow distribution of the plasma gas flow about the aft end of the elongated body.

10. The electrode of claim 9 wherein the radial extension is configured to extend circumferentially around the second surface of the elongated body.

11. The electrode of claim 9 wherein the radial extension includes one or more irregularities about its perimeter.

12. The electrode of claim 9 wherein the spiral flow passage includes one or more fins disposed about the first surface of the elongated body.

13. The electrode of claim 9 wherein the spiral flow passage includes two or more spiral flow grooves, the flow grooves being uniformly distributed about the first surface of the electrode body.

14. An electrode for a plasma arc torch comprising:
a generally cylindrical elongated body composed of an electrically conductive material, the elongated body having a proximal end arranged to connect to a power supply of the plasma arc torch and a distal end arranged to receive an emissive element;
a spiral flow passage disposed about a proximal surface relative to the proximal end of the elongated body, the spiral flow passage configured to forward a cooling gas flow about the proximal surface of the elongated body, the cooling gas flow separated from a plasma gas flow, the cooling gas flow and the plasma gas flow from a supply flow; and
a flange disposed about a surface relative to the distal end of the elongated body, the flange extending radially from the surface of the elongated body, the flange and the spiral flow passage defining a volume therebetween and configured to increase turbulence and of the supply gas flow within the volume, thereby establishing a predetermined substantially symmetrical gas flow distribution of the plasma gas flow about the distal end of the elongated body.

15. The electrode of claim 14 further including a flow passage disposed about a proximal surface relative to the proximal end of the elongated body, the flow passage configured to forward a portion of the plasma gas flow to cool the proximal surface of the elongated body.

16. The electrode of claim 14 wherein the flange is configured to extend circumferentially along the surface of the elongated body.

17. The electrode of claim 14 wherein the flange includes one or more discontinuities along its surface.

18. The electrode of claim 15 wherein the flow passage includes one or more fins disposed about the proximal surface of the elongated body.

* * * * *

UNITED STATES PATENT AND TRADEMARK OFFICE
CERTIFICATE OF CORRECTION

PATENT NO. : 9,480,139 B2
APPLICATION NO. : 14/040517
DATED : October 25, 2016
INVENTOR(S) : Yu Zhang et al.

Page 1 of 1

It is certified that error appears in the above-identified patent and that said Letters Patent is hereby corrected as shown below:

In the Claims

In Claim 14, at Column 16, Line 8, amend "turbulence and of the supply" to --turbulence and mixing of the supply--.

Signed and Sealed this
Tenth Day of January, 2017

Michelle K. Lee
*Director of the United States Patent and Trademark Office*